Sept. 8, 1959   S. P. BECKER ET AL   2,903,284
COUPLING
Filed April 26, 1956
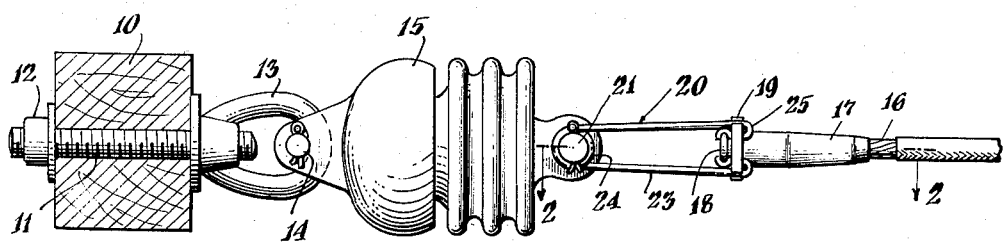
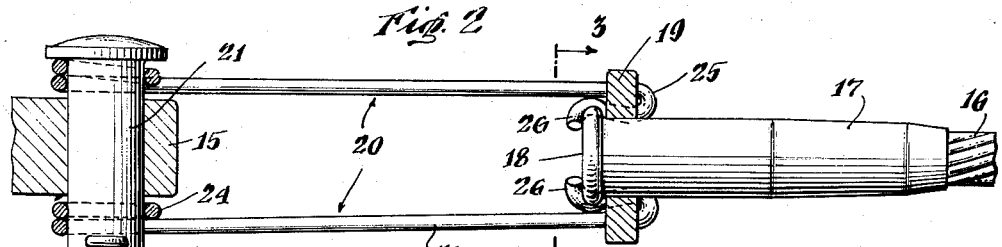
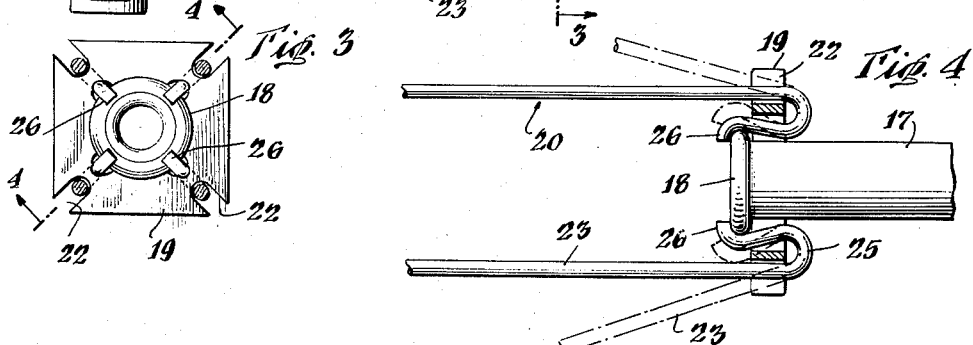
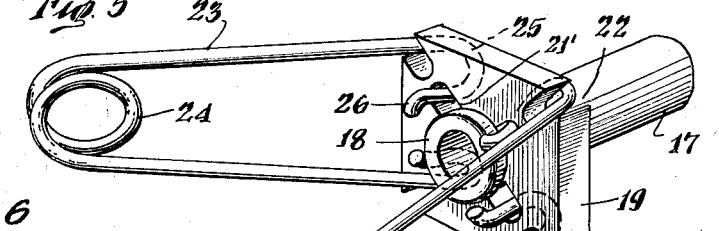
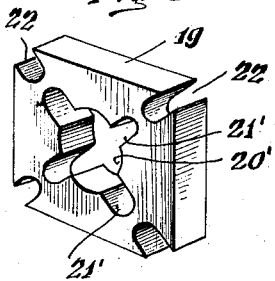
INVENTORS
Henry R. Wengen
Emmett H. Terhune
Stephen P. Becker
BY
Kane, Dalsimer and Kane
ATTORNEYS

2,903,284

COUPLING

Stephen P. Becker, Henry R. Wengen, and Emmett H. Terhune, Poughkeepsie, N.Y., assignors to Fargo Mfg. Company, Inc., Poughkeepsie, N.Y., a corporation of New York Application April 26, 1956, Serial No. 580,836

10 Claims. (Cl. 287—75)

This invention relates to a structurally and functionally improved coupling primarily intended for use in connection with electrical power transmission lines and where so employed, providing for example, a coupling of a "dead-end" type.

It is a primary object of the invention to design an assembly which will include relatively few parts, those parts being capable of ready manufacture by means of standard techniques and apparatus, and functioning over long periods of time with freedom from all difficulties. So manufactured, the parts may readily be connected to produce the complete assembly. That unit may be applied with facility to couple a supporting structure to a transmission line and thus anchor the latter.

A further object is that of providing an assembly of this nature in which the several parts will remain in proper association with each other, with no danger of those parts becoming detached or displaced incident to heavy strains imposed upon the coupling.

With these and other objects in mind, reference is had to the attached sheet of drawings illustrating one practical embodiment of the invention, and in which:

Fig. 1 is a side elevation of the coupling in applied position;

Fig. 2 is a longitudinal sectional view in enlarged scale taken along the line 2—2 in the direction of the arrows as indicated in Fig. 1;

Fig. 3 is a transverse sectional view taken along the line 3—3 in the direction of the arrows as indicated in Fig. 2;

Fig. 4 is a fragmentary sectional side view of certain of the parts and taken along the line 4—4 in the direction of the arrows as indicated in Fig. 3;

Fig. 5 is a perspective view of the bail and plate elements of the assembly; and Fig. 6 is a similar view of a preferred form of the plate element.

As is well understood by those conversant with the technique of supporting electrical transmission lines, it is frequently desirable to have the end of one of those lines anchored to a supporting structure. The coupling embracing the present invention is ideally suited for that use, especially where the transmission line has its end terminating with the coupling. With this in mind, the present drawings illustrate that preferred use. However, the coupling may be advantageously utilized in other associations. Therefore, the present disclosure is to be taken in an illustrative rather than a limiting sense.

Thus, referring to Fig. 1, the numeral 10 indicates a supporting structure of any desired type and through whihc an anchoring bolt 11 may extend. This bolt conveniently has a conventional nut and washer assembly 12 supported by its outer end and at its inner end mounts a loop or eye member 13. Suitably secured to the latter by, for example, a pin 14 is an insulator 15. A line 16 for conducting electrical current is connected with insulator 15 which thereby prevents the transmission of current to the supporting structure 10. The coupling embracing the present teachings is interposed between the insulator and line to connect these units against separation from each other.

At one end of the coupling proper, there is mounted a cable receiving and retaining unit. This will preferably involve an interior structure of the type shown in U.S. Patent 2,217,978 of October 15, 1940. The exterior of this connector will conveniently embrace a shell 17 of metal having at its outer end an opening communicating with the bore of that shell. Within that bore, gripping units will be disposed and the opening will have a diameter such that the end of the cable or line 16 may be introduced therethrough into operative association with these elements. The inner end of the shell terminates in a base flange or bead 18. A mounting plate embracing a body 19 is provided with a transverse opening. The diameter of the latter is such that shell 17 will freely slide through this opening throughout its major length. However, the diameter of bead or flange 18 will be sufficiently great that it may not pass through the plate opening. Wires or rods 20 connect plate 19 with insulator 15. That connection as shown may include a pin 21 passing through an opening formed in the outer end of insulator 15 and secured against accidental dislodgement therefrom.

Referring to the detailed structure of plate 19 and with particular reference to Figs. 3 to 6 inclusive, it will be seen that this unit is of conveniently rectangular configuration. Its transverse central opening has been indicated at 20'. This opening is preferably circular in outline and at points spaced 90° apart is formed with recesses 21' extending radially in the direction of the plate corners. Those corners are notched as at 22 to provide recesses complementary to recesses 21'. The width of these recesses should be such that the end zones of wires or rods 20 may be accommodated therein.

Now referring primarily to Fig. 5, it will be seen that these wires or rods are bent to preferably provide bail members. These will embrace legs 23 connected to each other by, for example, loops 24 which will have diameters such that the pin or other coupling element of the type indicated at 21 may pass therethrough. The free ends of the legs 23 terminate in inwardly-extending hook shaped portions 25 which are continued to extend for a limited distance substantially parallel to the legs 23. At their extreme ends, these hooks furnish inwardly-extending parts 26 which are curved to have a radius substantially equal to that of the bead or flange 18 of shell 17. The material providing these bails will preferably embody a certain amount of resiliency. Accordingly, even if zones of the bails are displaced to some extent with respect to other portions of the same, those zones will assume substantially their initial shape and relationship as pressures are relieved.

It is obvious that the several parts of the assembly may be readily and economically produced. When these parts are to be grouped together, it will simply be necessary to apply the legs 23 of each bail member to the notches 22 and to cause the hook-shaped end portions of these legs to extend within the recesses 21' communicating with opening 20'. Under these conditions, the parts will assume the relationship shown in Fig. 5 and in dot-and-dash lines in Fig. 4. The outer ends of shell 17 will now be passed through opening 20' until the flange or bead portion of the same lies adjacent the inturned ends 26. If at this time, the bail legs 23 are swung from the positions shown in dot-and-dash lines shown in Fig. 4 to that illustrated in full lines in such figure, parts 26 will snugly embrace the flange 18 and the adjacent hook portions 25 of the bails will cam against the edge surfaces of plate 19 to shift shell 17 to a fully seated position as illustrated in Figs. 2 and 3. Under these circumstances, in effect, a double cinch or hitch is embodied in the wire which is thus anchored around bead 18 and between shell 17 and the base of notches 22. Additionally, it passes around the material of body 19 intervening notches 21' and 22. Therefore, despite extreme strains, there will be no likelihood of the end portions of the bails creeping with respect to the plate body 19.

It will be appreciated that with this construction, it is not necessary to head the ends of the wires or rods which couple the plate to the anchoring and insulating structure. Far in excess of normal strains will not produce a dislodgement of the parts. At the same time, however, by simply removing pin 21 so that the ends of the bails may be swung outwardly with respect to each other, the inner ends of the same may be rocked with respect to the plate 19 as in Fig. 5. Thereupon, shell 17 may be projected rearwardly to cause its flange or bead 18 to clear bent end portions 26. This will permit of a complete disassembly of the parts, it being understood that any suitable expedient or desired structure might be resorted to to allow of an uncoupling of the transmission line or cable 16 from the gripping elements within shell 17.

It will be seen as a consequence of the foregoing construction that the bail ends provide a quick-detachable connection with the plate; this connection being capable of being readily established or terminated by simply swinging the parts with respect to each other and then resorting to an axial shifting. As part of this connection, a coupling is also furnished between the connector unit and more particularly its sleeve and the bail-plate assembly which prevents relative movements of the parts if the bead or flange structure—such as is included at 18—is utilized. Normally, the hook ends 26 will retain the sleeve against axial displacement with respect to the plate. When, however, the bails are swung, this retaining structure is rendered inoperative.

Thus among others, the several objects of the invention as specifically aforenoted are achieved. Obviously, numerous changes in construction and rearrangements of the parts might be resorted to without departing from the spirit of the invention as defined by the claims.

We claim:

1. A coupling including in combination a plate formed with an opening to receive a cable-retaining unit, said plate being formed with notches extending outwardly within the edges of said opening and further notches extending inwardly of its body from its outer edge, a pair of bails each including a pair of arms having their outer ends terminating in generally hook-shaped portions and the inner ends of said arms being connected to each other, means for coupling such inner arm ends against separation, the outer arm portions extending within the notches formed in the outer edge of said plate, the hook-shaped portions underlying the same and the ends of such portions extending within the notches defined in the opening edges to a point adjacent the upper face of the plate.

2. A coupling including in combination a plate formed with an opening, a pair of rods having inner ends rockingly connected to said plate, means releasably connecting the opposite ends of said rods to normally maintain them against movements with respect to each other, a cable-securing unit extending into the opening of said plate to be mounted by the latter, and means controlled by the rocking of said rods with respect to said plate to release said unit therefrom upon said rods being rocked away from their normal positions with respect to each other.

3. In a coupling as defined in claim 2, means forming a part of the rocking connection between said plate and rods whereby the latter may be detached from said plate and said unit, when mounted by said plate, preventing such detachment.

4. A coupling including in combination a plate formed with an opening to receive a cable-retaining unit, a rod comprising a main body extending substantially perpendicular to the surface of said plate and past a side edge of the same, a hook-shaped end portion included in said rod and positioned adjacent an edge of said plate to extend around one surface of that plate adjacent its opening to a point beyond an opposite plate surface, and means forming a part of said rod adjacent such opposite surface to provide a part to grip and to maintain a unit within the opening of said plate against displacement with respect to the same.

5. In a coupling as defined in claim 4, said plate being formed with a notch in its side edge to accommodate and retain the rod therein.

6. In a coupling as defined in claim 4, said plate being formed with a notch in the edge surface of its opening and the end portion of said rod extending into said notch.

7. A coupling including in combination a plate formed with an opening to receive a cable-retaining unit, rods extending substantially perpendicular to and beyond one face of said plate and past the outer side edges thereof, hook-shaped portions adjacent the ends of said rods and extending across the opposite face of said plate, said plate being formed with notches in its side edges to each receive one of said rods, the ends of the latter projecting through said plate opening, above said one face thereof into the area of the opening, and means at such rod ends to secure a unit extending through the plate opening against movement with respect to said plate.

8. In a coupling as defined in claim 7, two of such rods providing a bail and a pair of such bails being included in said coupling and disposed adjacent opposite sides of said plate to extend beyond the same and means including a pin connecting the ends of such bails against movement with respect to each other.

9. In a coupling as defined in claim 7, a unit disposed to extend through said plate opening, a bead forming a part of said unit and the ends of said rods being bent to extend around and engage said bead when said rods extend substantially perpendicular to said plate.

10. In a coupling as defined in claim 7, said plate being formed with further notches in the edge defining its opening, and each of said rods extending into one of said latter openings.

References Cited in the file of this patent

UNITED STATES PATENTS

| 685,901 | Baker | Nov. 5, 1901 |
| 2,700,199 | Buckley | Jan. 25, 1955 |
| 2,700,200 | Buckley | Jan. 25, 1955 |